United States Patent
Baerthlein et al.

(10) Patent No.: US 9,400,512 B2
(45) Date of Patent: Jul. 26, 2016

(54) SYSTEM AND METHOD FOR OPERATING AN ON LOAD TAP CHANGER FOR REGULATING VOLTAGE ON AN ELECTRIC POWER SYSTEM

(71) Applicant: General Electric Company, Schenectady, NY (US)

(72) Inventors: Eva-Maria Baerthlein, Hamburg (DE); Ara Panosyan, Bavaria (DE)

(73) Assignee: General Electric Company, Niskayuna, NY (US)

( * ) Notice: Subject to any disclaimer, the term of this patent is extended or adjusted under 35 U.S.C. 154(b) by 246 days.

(21) Appl. No.: 14/109,290

(22) Filed: Dec. 17, 2013

(65) Prior Publication Data

US 2015/0168965 A1  Jun. 18, 2015

(51) Int. Cl.
*H01F 21/00* (2006.01)
*G05F 1/14* (2006.01)
(Continued)

(52) U.S. Cl.
CPC .................. *G05F 1/14* (2013.01); *H02J 3/1878* (2013.01); *H02P 13/06* (2013.01)

(58) Field of Classification Search
CPC ........................................................ H02J 3/00
USPC ............ 363/71; 323/207, 209, 255–258, 299, 323/301, 304–305, 340, 341, 343, 355, 361, 323/906; 307/103, 147; 340/635; 324/536
See application file for complete search history.

(56) References Cited

U.S. PATENT DOCUMENTS 3,581,188 A * 5/1971 Watanabe ............... H01F 27/40
  323/340
3,662,253 A * 5/1972 Yamamoto .............. H01F 29/04
  323/343
(Continued)

FOREIGN PATENT DOCUMENTS

EP 2482415 A1 8/2012
GB 895954 A 5/1962
JP 2003102128 A 4/2003

OTHER PUBLICATIONS

Dohnal, Dieter, "On-Load Tap-Changers for Power Transformers: A Technical Digest," Maschinenfabrik Reinhausen GmbH, Regensburg, Germany, retrieved from website www.reinhausen.com/XparoDownload.ashx?raid=15497 (28 pgs).
(Continued)

*Primary Examiner* — Adolf Berhane
*Assistant Examiner* — Nusrat Quddus
(74) *Attorney, Agent, or Firm* — Nitin J. Joshi

(57) ABSTRACT

An electric power system includes an on-load tap changing (OLTC) transformer. The transformer includes a plurality of primary windings and a plurality of secondary windings. At least a portion of one of the primary windings and the secondary windings are inductively coupled to each other. The system also includes at least one on-load tap changer coupled to at least one of the primary windings and the secondary windings. The on-load tap changer is selectively configurable to regulate the portion of at least one of the primary windings and the secondary windings inductively coupled to each other. The system further includes at least one processor coupled to the on-load tap changer. The processor is configured to adaptively regulate a voltage set-point of the on-load tap changer as a function of an adaptive OLTC transformer power flow dependent voltage set-point characteristic.

17 Claims, 13 Drawing Sheets

(51) Int. Cl.
*H02J 3/18* (2006.01)
*H02P 13/06* (2006.01)

(56) References Cited

U.S. PATENT DOCUMENTS

| | | | | |
|---|---|---|---|---|
| 5,006,784 | A * | 4/1991 | Sonntagbauer | H01F 29/04 323/343 |
| 5,327,355 | A | 7/1994 | Chiba et al. | |
| 5,821,716 | A * | 10/1998 | Okanik | G05F 1/147 318/478 |
| 5,990,667 | A | 11/1999 | Degeneff et al. | |
| 6,313,614 | B1 | 11/2001 | Persson et al. | |
| 7,255,369 | B2 * | 8/2007 | Matsumiya | F16F 7/12 188/376 |
| 7,982,442 | B2 * | 7/2011 | Solyom | G05F 1/14 323/247 |
| 7,989,983 | B2 | 8/2011 | Folts et al. | |
| 7,990,743 | B2 * | 8/2011 | Walling | H02J 3/383 323/207 |
| 7,994,658 | B2 | 8/2011 | Cardinal et al. | |
| 8,203,319 | B2 * | 6/2012 | Fujita | H01H 9/0011 323/255 |
| 8,437,883 | B2 | 5/2013 | Powell et al. | |
| 8,476,874 | B2 | 7/2013 | Labuschagne et al. | |
| 8,577,510 | B2 * | 11/2013 | Powell | G01D 4/002 290/44 |
| 8,847,570 | B1 * | 9/2014 | Bell | G06Q 50/06 232/301 |
| 2004/0070359 | A1 | 4/2004 | Dohnal et al. | |
| 2010/0001700 | A1 * | 1/2010 | Santos | G05F 1/14 323/256 |
| 2010/0090674 | A1 * | 4/2010 | Bell | H02J 3/1878 323/301 |
| 2011/0215790 | A1 | 9/2011 | Hyde et al. | |
| 2011/0304141 | A1 * | 12/2011 | Van Dyck | H02J 3/1878 290/44 |
| 2012/0112719 | A1 * | 5/2012 | Xia | H02M 1/143 323/282 |
| 2012/0200279 | A1 * | 8/2012 | Pamulaparthy | H02J 3/1807 323/301 |
| 2012/0306471 | A1 * | 12/2012 | Green | H01H 9/542 323/355 |
| 2013/0307494 | A1 * | 11/2013 | Meinecke | H02J 3/1878 323/205 |

OTHER PUBLICATIONS

European Search Report and Opinion issued in connection with corresponding EP Application No. 14197969.0 on Sep. 22, 2015.

* cited by examiner

SYSTEM AND METHOD FOR OPERATING AN ON LOAD TAP CHANGER FOR REGULATING VOLTAGE ON AN ELECTRIC POWER SYSTEM

BACKGROUND

The field of the disclosure relates generally to electric power systems, and, more particularly, to electric power distribution systems including transformers with tap changers and their methods of operation.

At least some known electric power systems include electric power transformers configured to regulate voltages through the use of on-load tap changers. An on-load tap changing (OLTC) transformer has several connection points, so called "taps", along at least one of its windings. With each of these tap positions a certain number of turns is selected. Since the output voltage of the OLTC transformer is determined by the turns ratio of the primary windings versus the secondary windings, the output voltage can be varied by selecting different taps. The tap position to connect to is determined by a suitable controller and tap selection is shifted through an on-load tap changing device. Since high voltages are involved, and the taps are changed while the OLTC transformer is under load, each time a tap is changed, arcing occurs. Arcing facilitates deterioration of the associated materials, thereby tending to decrease the service life of the tap changer mechanisms. Therefore, it is typically desirable to shift taps as infrequently as possible. However, it is not unusual to have dozens of tap changes over a 24-hour period, especially with the increasing share of variable and intermittent distributed generation (DG) in the electric power system. The operators of the electric power system determine the tradeoff between the frequency and number of on-load tap changes with the subsequent wear on the tap changer and the quality of the voltage on the portion of the system maintained by the affected OLTC transformer.

Many known on-load tap changer controllers are configured to move the tap in an OLTC transformer automatically as a function of "raise" and "lower" commands to maintain the system voltage at a predetermined value, i.e., a constant voltage set-point. Typically, on-load tap changer controllers monitor the difference between the measured voltage at the on-load tap changer and the voltage set-point. When the difference between this measured voltage and the predetermined voltage set-point exceeds a previously defined tolerance band, a tap change is triggered.

Many known electric power systems include a growing share of distributed generation (DG). Many types of DG significantly increase the variability of the voltage on the portion of the system maintained by the affected OLTC transformer, thereby increasing the frequency of commanded tap changes. Moreover, with a significant portion of DG on one side of the transformer, i.e., typically the lower voltage downstream side, electric power flow through the OLTC transformer may be reversed, i.e., transmitted from the low voltage side to the high voltage side of the transformer. As such, the affected OLTC controller needs to be configured to detect such a power flow reversal and still be able to ensure correct voltage regulation. More specifically, a variable voltage set-point may be necessary. At times of large reverse power flow, which results in high network voltages, especially when DG is connected at remote feeder ends, a low voltage set-point is required. In contrast, during times of high demand by the loads and low network voltages, a higher voltage set-point is desired.

FIG. 1 is a graphical representation of a prior art control scheme 20 for OLTC devices (not shown). Control scheme 20 includes a y-axis 22 that represents a voltage set-point ($V_{set}$) for a voltage measured proximate a transformer (not shown) or proximate a feeder end through potential transformers (PTs) (not shown). Y-axis 22 is labeled using the "per-unit" system. Control scheme 20 also includes an x-axis 24 that represents electric power transmitted through the transformer and intersects y-axis 22 at a point 26. X-axis 24 is labeled in kiloWatts (kW) and includes a positive power flow portion 28 to the right of intersection point 26 and a reverse power flow portion 30 to the left of intersection point 26.

Control scheme 20 shows a first known control curve 40 that includes a first segment 42 extending from a maximum reverse power flow value 44 to a first predetermined breakpoint 46 associated with a predetermined reverse power flow value 48 at a constant voltage set-point value of approximately 0.975 pu. Control curve 40 also includes a second segment 50 extending from a maximum forward power flow value 52 to a second predetermined breakpoint 54 associated with a predetermined forward power flow value 56 at a constant voltage set-point value of approximately 1.025 pu. Control curve 40 further includes a third segment 58 that extends linearly from first breakpoint 46 to second breakpoint 54 through an intersection with y-axis 22.

Control curves 40 provides a variable voltage set-point as a function of forward and reverse power flow. Since the measured voltage proximate the on-load tap changer is virtually constant, the difference between the measured voltage and the voltage set-point will change by a variation of the voltage set-point value. As described above, a tap change is induced when this difference exceeds the predefined tolerance band. Therefore, a tap change is essentially triggered by varying the voltage set-point. In accordance with this, many tap changes can be expected for linear segment 58 of curve 40. Moreover, since the overall power flow dependent voltage set-point characteristic is substantially static, many tap changes may be experienced throughout a normal cycle of power flow through the transformer due to control curve 40.

BRIEF DESCRIPTION

In one aspect, an electric power system is provided. The electric power system includes an on-load tap changing (OLTC) transformer. The transformer includes a plurality of primary windings and a plurality of secondary windings. At least a portion of one of the primary windings and the secondary windings are inductively coupled to each other. The system also includes at least one on-load tap changer coupled to at least one of the plurality of primary windings and the plurality of secondary windings. The at least one on-load tap changer is selectively configurable to regulate the portion of at least one of the primary windings and the secondary windings inductively coupled to each other. The system further includes at least one processor coupled to the at least one on-load tap changer. The at least one processor is configured to adaptively regulate a voltage set-point of the on-load tap changer as a function of an adaptive OLTC transformer power flow dependent voltage set-point characteristic.

In a further aspect, a tap changer for an on-load tap changing (OLTC) transformer is provided. The OLTC transformer includes a plurality of primary windings and a plurality of secondary windings. The OLTC transformer includes a plurality of taps. Each tap of the plurality of taps is coupled to a different portion of at least one of the plurality of primary windings and the plurality of secondary windings. The tap changer includes a tap selection device configured to selectively engage a portion of the plurality of taps. The tap changer further includes a drive device coupled to the tap selection device. The tap changer also includes at least one processor coupled to the drive device. The at least one processor is configured to adaptively regulate a voltage set-point of the tap changer as a function of an adaptive OLTC transformer power flow dependent voltage set-point characteristic.

In another aspect, a method of regulating a voltage on at least a portion of an electric distribution system is provided. The electric distribution system includes at least one on-load tap changing (OLTC) transformer that includes a plurality of primary windings and a plurality of secondary windings. The electric distribution system also includes a tap changer configured to regulate an inductive coupling between the plurality of primary windings and the plurality of secondary windings. The tap changer includes at least one processor. The method includes measuring electric power flow transmitted through the OLTC transformer and measuring a voltage of the at least a portion of the electric power system. The method also includes adaptively regulating a voltage set-point of the tap changer as a function of an adaptive OLTC transformer power flow dependent voltage set-point characteristic.

DRAWINGS

These and other features, aspects, and advantages of the present invention will become better understood when the following detailed description is read with reference to the accompanying drawings in which like characters represent like parts throughout the drawings, wherein.

Figure 5:
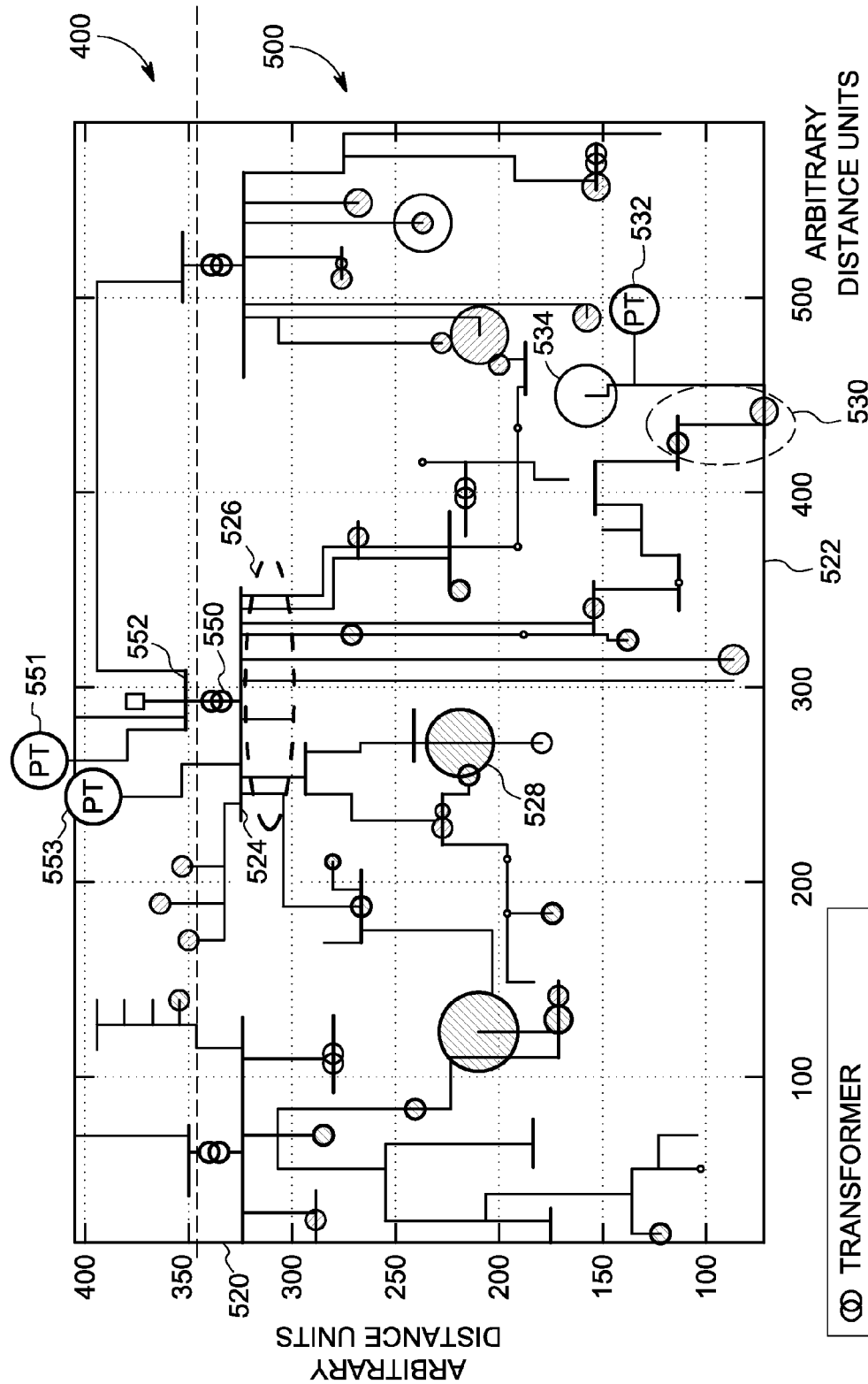
FIG. 5 is an expanded schematic diagram of a portion of the electric power distribution system shown in FIG. 4 and taken at area 5.
Figure 6:
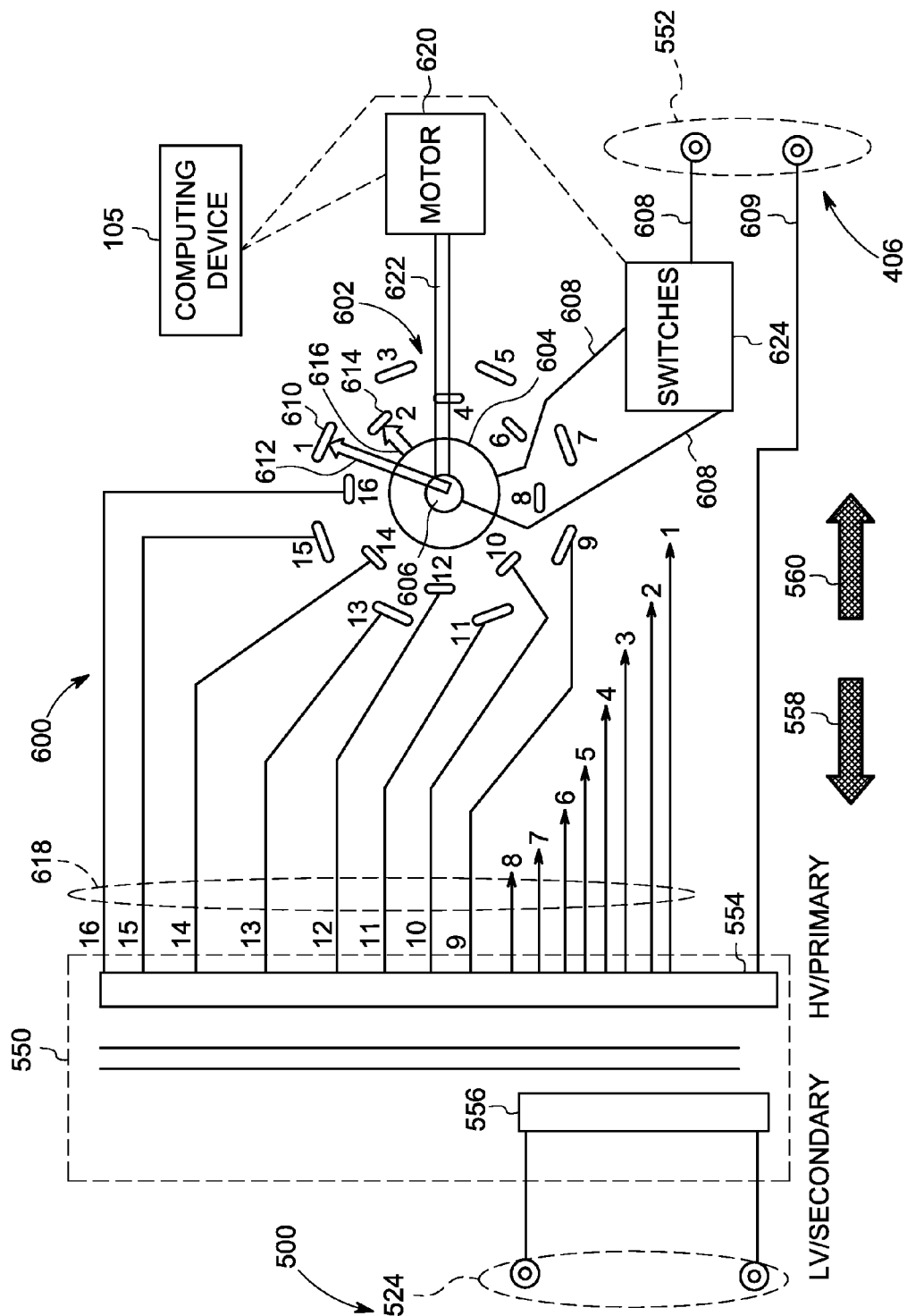
FIG. 6 is a schematic diagram of an exemplary tap changer device that may be used with the electric power distribution system shown in FIG. 5.
Figure 7:
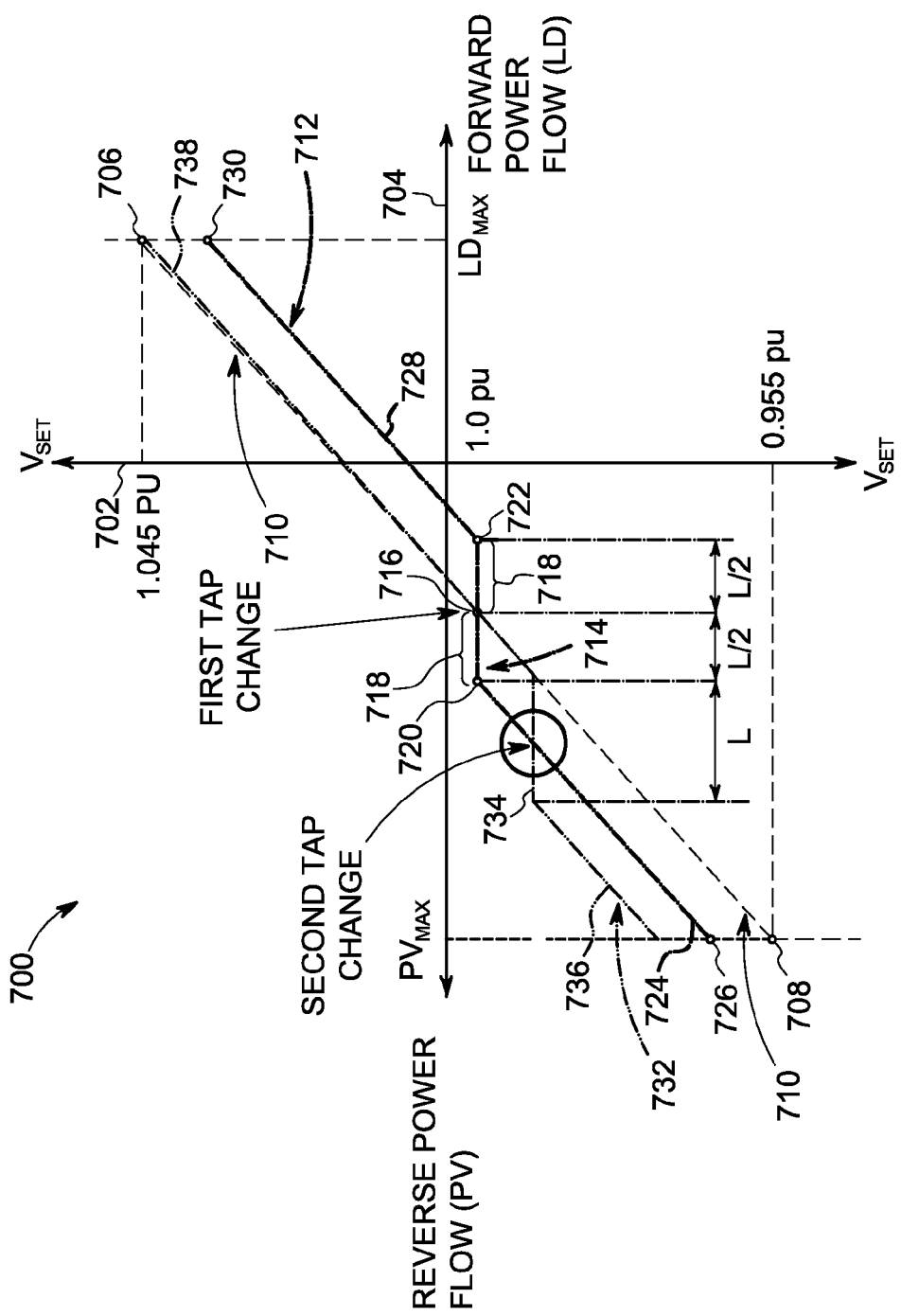
FIG. 7 is a graphical representation of an exemplary control scheme for the tap changer device shown in FIG. 6.
Figures 15, 16:
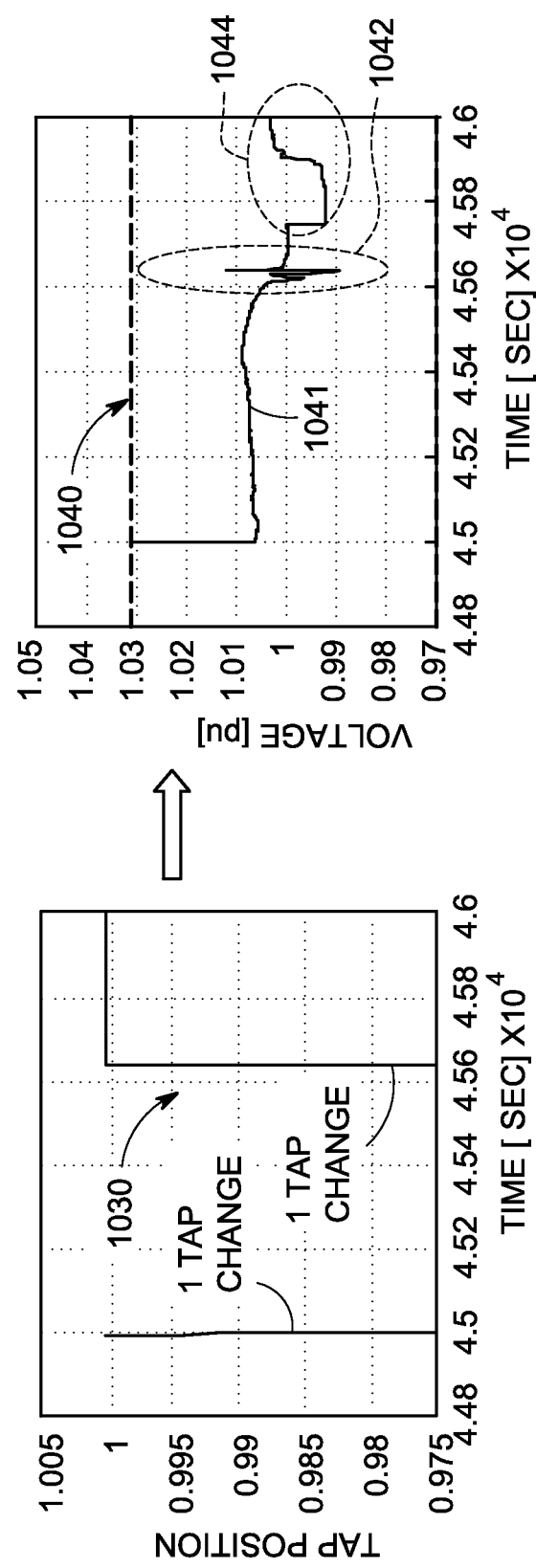

FIG. 15 is a graphical representation of tap changes of the tap changer device shown in FIG. 6 during use of the control scheme shown in FIG. 7 with a hysteresis factor of 15%; and FIG. 16 is a graphical representation of voltage changes at a feeder end of the electric power distribution system shown in FIG. 5 due to the tap changer device shown in FIG. 6 during use of the control scheme shown in FIG. 7 with a hysteresis factor of 15%.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The control schemes for the tap changers embedded within the on-load tap changing (OLTC) transformers typically used by the electric power distribution systems described herein provide a cost-effective method for regulating voltage on such distribution systems. Specifically, the embodiments described herein replace known static power flow-dependent voltage set-point characteristics with adaptive characteristics that are determined through the number of previous tap changes in the tap changer. More specifically, the embodiments described herein include a hysteresis factor that facilitates generating a substantially horizontal, i.e., a substantially constant voltage versus power flow section in a variable voltage set-point characteristic that allows limited changes in power flows after a tap change without incurring additional short-term tap changes. Therefore, the embodiments described herein dynamically and adaptively regulate voltage while decreasing tap changes, thereby facilitating smooth and stable voltage control on the feeders downstream of the transformer regardless of variable electrical conditions due to fast variations in loads and distributed generation (DG). The decreased number of tap changes facilitates extending the service life of the tap changers and improves the regulation of voltage on electric distribution networks.

Figure 1:
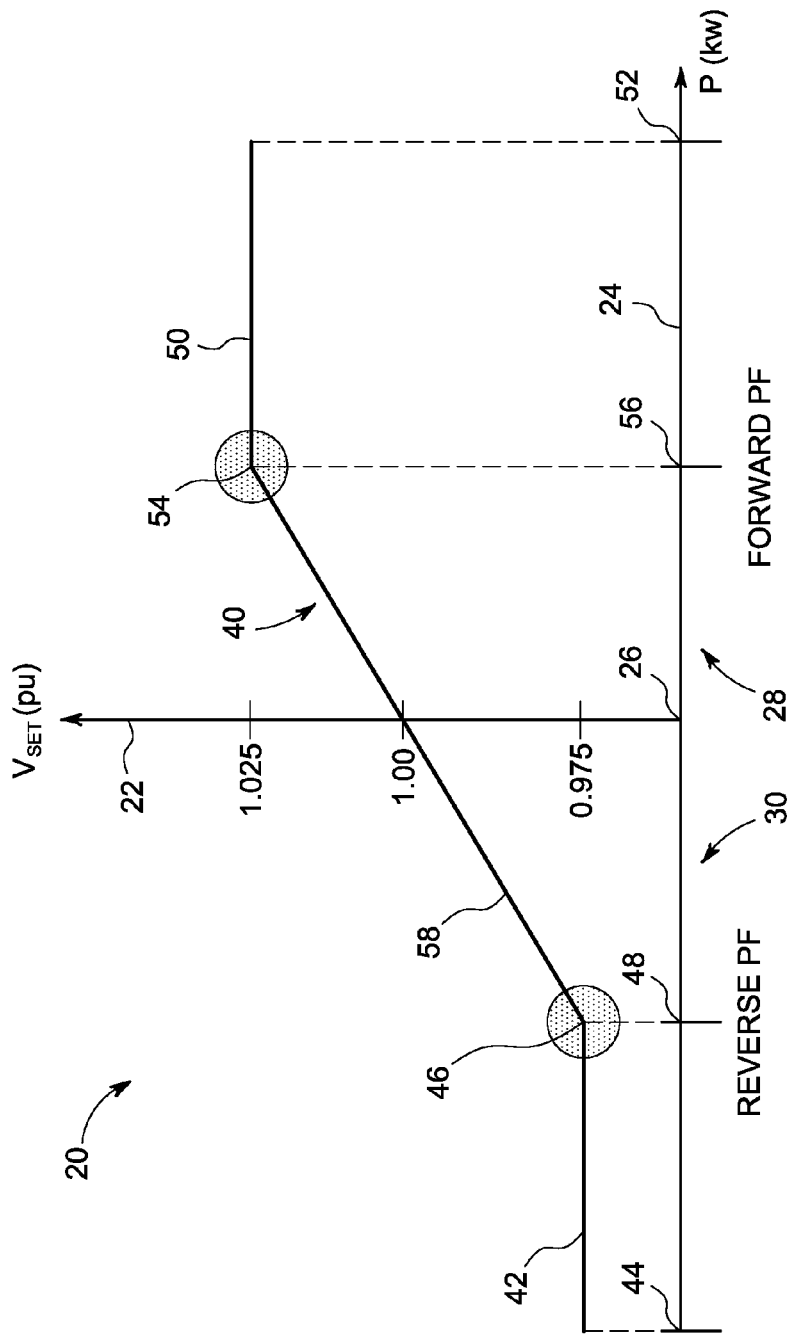
FIG. 1 is a graphical representation of a prior art control scheme for on-load tap changing (OLTC) devices.

In addition, as compared to control schemes such as those shown in FIG. 1, resource expenditure in defining complex parameters required for conformance with utility requirements is significantly reduced. For example, in the embodiments described herein, constant voltage set-points of the control scheme for the higher ends of reverse and forward power flows, i.e., segments 42 and 50 do not need to be defined. Also, power flow values for the associated breakpoints 46 and 54. i.e., power flow values 48 and 56, respectively, are not required. In contrast with such known control schemes, the embodiments described herein only require two set values by the utility, which is typically easily achieved. Therefore, embodiments described herein may be implemented within most electric distribution grids without complex adaptation and parameter definition.

Figure 2:
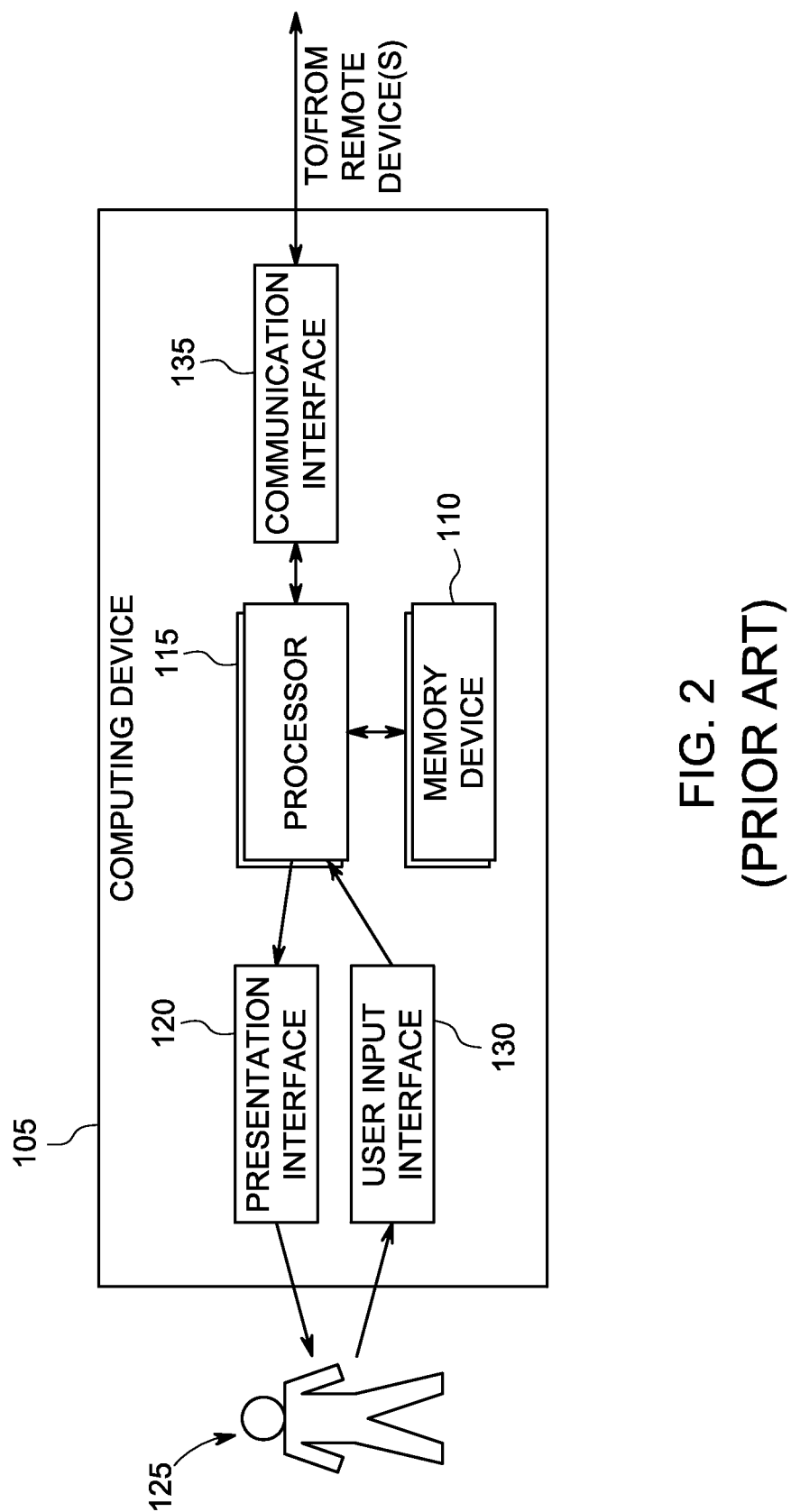
FIG. 2 is a block diagram of an exemplary computing device.

FIG. 2 is a block diagram of an exemplary computing device 105 that may be used to perform monitoring and/or control of an electric power distribution system and, more specifically, a tap changer device associated with a distribution transformer (neither shown in FIG. 2). Also, in the exemplary embodiment, computing device 105 monitors and/or controls any piece of equipment, any system, and any process associated with the electric power distribution system, e.g., without limitation, voltage regulators, at least a portion of distributed generation (DG), and monitoring devices (neither shown in FIG. 2). Computing device 105 includes a memory device 110 and a processor 115 operatively coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media.

Memory device 110 may be configured to store operational measurements including, without limitation, real-time and historical transformer (high side and low side) and feeder voltage values, tap changes, and/or any other type data. Also, memory device 110 includes, without limitation, sufficient data, algorithms, and commands to facilitate monitoring and control of the components within the associated electric power distribution system.

In some embodiments, computing device 105 includes a presentation interface 120 coupled to processor 115. Presentation interface 120 presents information, such as a user interface and/or an alarm, to a user 125. In some embodiments, presentation interface 120 includes one or more display devices. In some embodiments, presentation interface 120 presents an alarm associated with the associated electric power distribution system being monitored and controlled, such as by using a human machine interface (HMI) (not shown in FIG. 2). Also, in some embodiments, computing device 105 includes a user input interface 130. In the exemplary embodiment, user input interface 130 is coupled to processor 115 and receives input from user 125.

A communication interface 135 is coupled to processor 115 and is configured to be coupled in communication with one or more other devices, such as a sensor or another computing device 105, and to perform input and output operations with respect to such devices while performing as an input channel. Communication interface 135 may receive data from and/or transmit data to one or more remote devices. For example, a communication interface 135 of one computing device 105 may transmit an alarm to the communication interface 135 of another computing device 105.

In the exemplary embodiment, control of a tap changer for a transformer (neither shown in FIG. 2) is performed with local control devices, i.e., a localized computing device 105. Alternatively, control of such tap changers is performed as a portion of a larger, more comprehensive system, as discussed further below.

Figure 3:
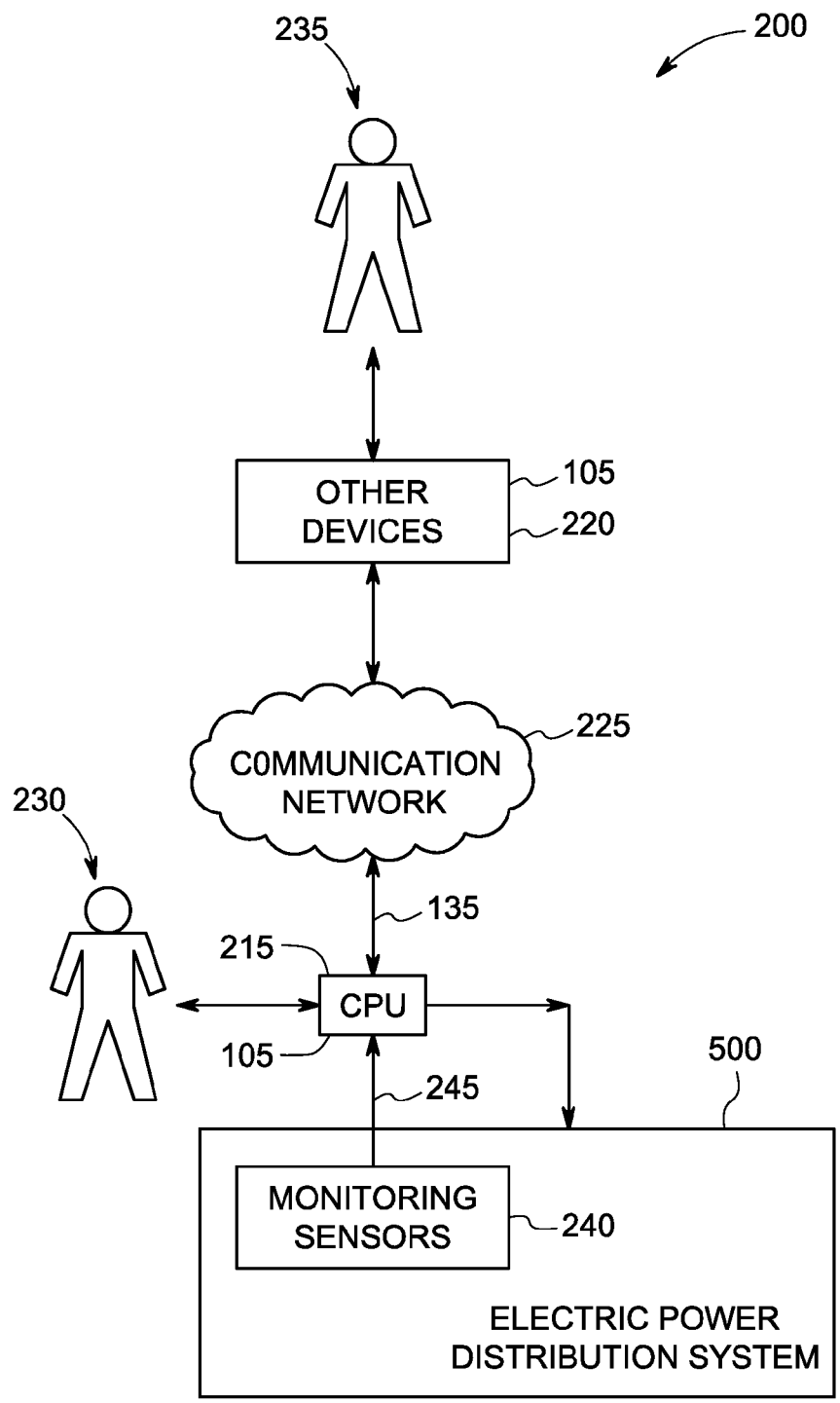
FIG. 3 is a block diagram of a portion of an exemplary monitoring and control system that may include the computing device shown in FIG. 2.

FIG. 3 is a block diagram of a portion of a monitoring and control system, i.e., a Supervisory Control and Data Acquisition (SCADA) system 200 that may be used to monitor and control at least a portion of an electric power distribution system 500. As used herein, the term "SCADA system" refers to any control and monitoring system that may monitor and control electric power distribution system 500 across multiple sites, remote sites, and large distances. SCADA system 200 includes at least one central processing unit (CPU) 215 configured to execute monitoring and control algorithms and monitoring and control logic. CPU 215 may be coupled to other devices 220 via a communication network 225. In some embodiments, CPU 215 is a computing device 105.

CPU 215 interacts with a first operator 230, e.g., without limitation, via user input interface 130 and/or presentation interface 120. In one embodiment, CPU 215 presents information about electric power distribution system 500, such as alarms, to operator 230. Other devices 220 interact with a second operator 235, e.g., without limitation, via user input interface 130 and/or presentation interface 120. For example, other devices 220 present alarms and/or other operational information to second operator 235. As used herein, the term "operator" includes any person in any capacity associated with operating and maintaining electric power distribution system 500, including, without limitation, shift operations personnel, maintenance technicians, and electric dispatch facility supervisors.

Electric power distribution system 500 includes one or more monitoring sensors 240 coupled to CPU 215 through at least one input channel 245. Monitoring sensors 240 collect operational measurements including, without limitation, AC voltages and currents generated within and transmitted through electric power distribution system 500. Monitoring sensors 240 repeatedly, e.g., periodically, continuously, and/or upon request, transmit operational measurement readings at the time of measurement. CPU 215 receives and processes the operational measurement readings. In one embodiment, such data may be transmitted across network 225 and may be accessed by any device capable of accessing network 225 including, without limitation, desktop computers, laptop computers, and personal digital assistants (PDAs) (neither shown).

While FIG. 3 describes an alternative embodiment, some components described for FIG. 3 may be used with the standalone computing device 105 (shown in FIG. 2), e.g., without limitation, monitoring sensors 240. As such, computing device 105 includes, without limitation, sufficient data, algorithms, and commands to independently facilitate voltage control of electric power distribution system 500 as described herein, thereby making SCADA system 200 and communications network 225 unnecessary.

Figure 4:
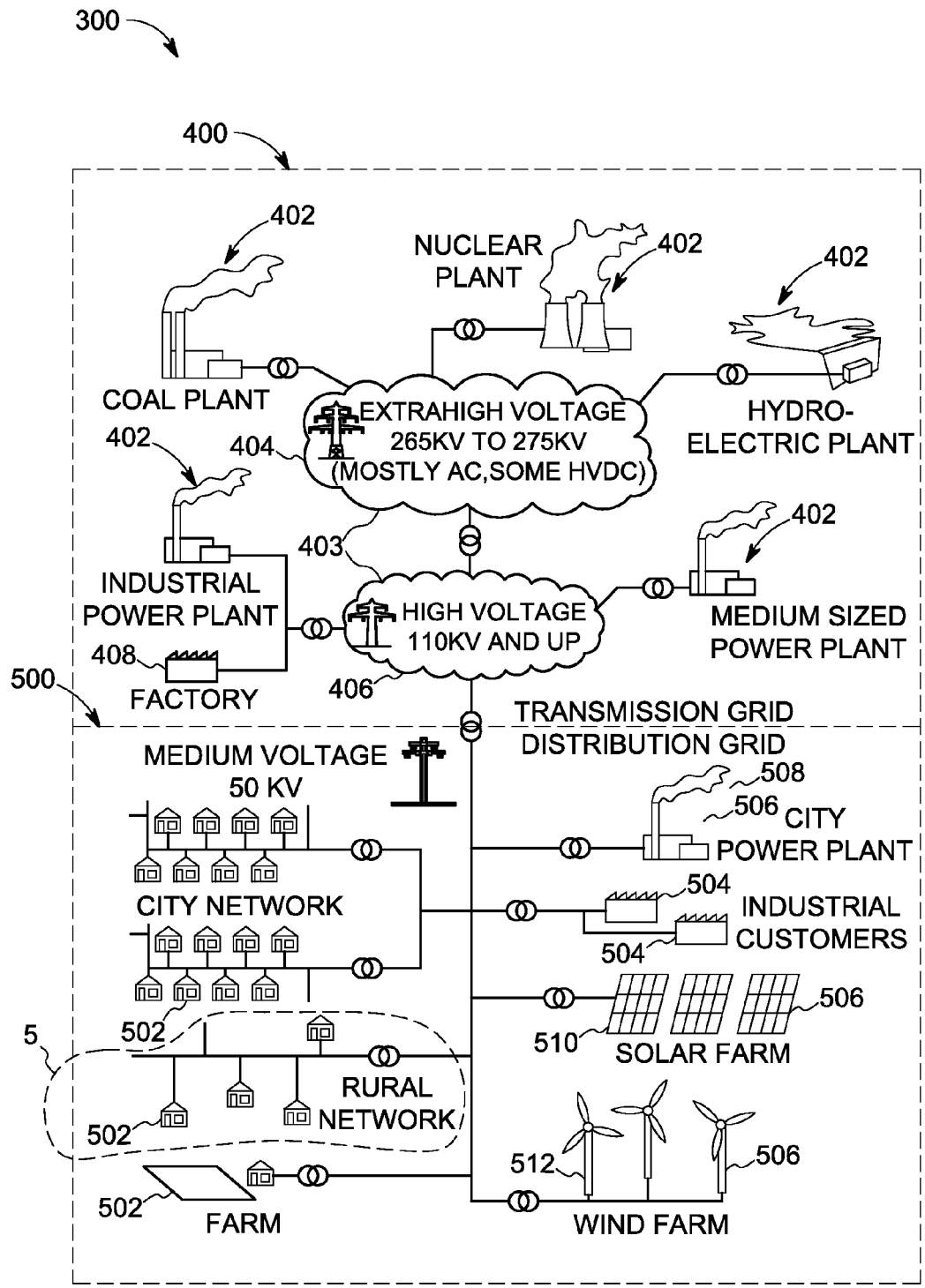
FIG. 4 is a general schematic diagram of an exemplary electric power network including both an exemplary transmission network and an exemplary electric power distribution system with distributed generation (DG)

FIG. 4 is a general schematic diagram of an exemplary electric power network 300. In general, electric power network 300 typically includes a generation and transmission portion 400 coupled to an exemplary electric power distribution system 500. Generation and transmission portion 400 includes a plurality of power plants 402 generating and transmitting electric power to a transmission grid 403, which includes an extra high voltage transmission grid 404 and a high voltage transmission grid 406 through which power is transmitted to electric power distribution system 500. In the exemplary embodiment, extra high voltage grid 404 includes voltages greater than approximately 265 kiloVolts (kV) and high voltage transmission grid 406 includes voltages between approximately 110 kV and approximately 265 kV. Alternatively, extra high voltage grid 404 and high voltage transmission grid 406 have any voltages that enable operation of electric power distribution system 500 as described herein. Some electric power customers, such as power-intensive industrial facilities, e.g., and without limitation, factory 408, are coupled to high voltage transmission grid 406. Electric power network 300 may include, without limitation, any number, type and configuration of power plants 402, extra high voltage transmission grids 404, high voltage transmission grids 406, factories 408, and electric power distribution systems 500.

Also, in the exemplary embodiment, electric power distribution system 500 includes low wattage consumers 502 and industrial medium wattage consumers 504. Electric power distribution system 500 also includes distributed generation (DG) 506. Such DG 506 includes, without limitation, a city power plant 508, a solar farm 510, and a wind farm 512. While electric power distribution system 500 is shown with an exemplary number and type of distributed generators 506, electric power distribution system 500 may include any number and type of distributed generators 506, including, without limitation, individual diesel generators, micro-turbines, solar collector arrays, solar photovoltaic (PV) arrays, and wind turbines.

FIG. 5 is an expanded schematic diagram of a portion of electric power distribution system 500 taken at area 5 (shown in FIG. 4) that uses computing device 105 (shown in FIG. 2). A y-axis 520 and an x-axis 522 are labeled with distances in arbitrary units. Electric power distribution system 500 includes a plurality of substation feeder buses 524. Each of substation feeder buses 524 is coupled to a plurality of feeder line segments 526. Many of feeder line segments 526 include a plurality of loads 528 and solar PV arrays 530 that are both configured with various sizes. The larger loads 528 and PV arrays 530 are shown with larger-diameter circles. Loads 528 vary between 0.1 kilowatts (kW) and 20 kW. Solar PV arrays 530 vary between 3 kW and 85 kW. Alternatively, loads 528 and solar PV arrays 530 have any mix of ratings that enables operation of electric power distribution system 500 as described herein. In one embodiment, at least one potential transformer (PT) 532 may be coupled to a feeder end 534 to measure feeder voltage after most of the voltage drop is induced. PT 532 measures voltage at feeder end 534 and transmit signals representative of the voltage. Electric power distribution system 500 may also include voltage regulators, capacitor banks, distributed generation in the form of diesel generators, and other devices (neither shown) typically used with distribution systems.

Electric power distribution system 500 further includes at least one substation distribution transformer 550 coupled to a medium voltage substation bus 552, e.g., without limitation, 20 kV, and one of the low voltage substation feeder buses 524. In the exemplary embodiment, transformer 550 is rated for 630 kilo-Volt-Amperes (kVA). Alternatively, transformer 550 has any rating that enables operation of electric power distribution system 500 as described herein. Also, in the exemplary embodiment, transformer 550 is an OLTC transformer with a tap changer device (not shown in FIG. 5, and described further below). A PT 551 is coupled to medium voltage substation bus 552 proximate transformer 550 to measure voltage on bus 552 and transmit signals representative of the voltage on bus 552 to at least one of computing device 105 (shown in FIG. 2) and SCADA system 200. Similarly, a PT 553 is coupled to low voltage substation feeder bus 524 proximate transformer 550 to measure voltage on bus 524 and transmit signals representative of the voltage on bus 524 to at least one of computing device 105 (shown in FIG. 2) and SCADA system 200. In at least some embodiments, a PT is used to measure voltage proximate the tap changer. As such, for those embodiments, and because more than one voltage measurement is typically not needed, PT 551 and PT 553 may not be needed.

FIG. 6 is a schematic diagram of an exemplary on-load tap changer 600 that may be used with electric power distribution system 500 (shown in FIG. 5) and computing device 105 (shown in FIG. 2). In the exemplary embodiment, tap changer 600 is a rotary tap selector in-tank type with a make-before-break contactor configuration. Alternatively, tap changer 600 is any type of tap changer that enables operation of electric power distribution system 500 as described herein. OLTC substation distribution transformer 550 includes a plurality of medium voltage, i.e., primary windings 554 coupled to medium voltage substation bus 552 through tap changer 600. OLTC substation distribution transformer 550 also includes a plurality of low voltage, i.e., secondary windings 556 coupled to the low voltage substation feeder buses 524. In the exemplary embodiment, tap changer 600 is physically coupled to primary windings 554. Alternatively, tap changer 600 is physically coupled to secondary windings 556.

Electric power may be transmitted in both directions through transformer 550. Specifically, electric power is transmitted from primary windings 554 to secondary windings 556 when power drawn by loads 528 (shown in FIG. 5) is greater than power generation of the sum of operating DG downstream of transformer 550, e.g., solar PV arrays 530 (shown in FIG. 5), power plant 508, solar farm 510, and wind farm 512 (all three shown in FIG. 4), and any diesel generators and micro-turbines (neither shown). Under such conditions, electric power flows from primary windings 554 to secondary windings 556, i.e., from high voltage transmission grid 406 into electric power distribution system 500 as shown with forward arrow 558 and may be referred to as forward power flow or positive power flow. In contrast, if the DG downstream of transformer 550 is generating more power than is consumed downstream of transformer 550 by loads 528, electric power transmission is reversed and electric power flows from secondary windings 556 to primary windings 554, i.e., from electric power distribution system 500 into high voltage transmission grid 406 as shown with reverse arrow 560. This situation may be referred to as reverse power flow or negative power flow.

Tap changer 600 includes a rotary tap selector 602 that includes a first, or outer contact portion 604 and a second, or inner contact portion 606, both coupled to medium voltage substation bus 552 through a plurality of conduits 608. Windings 554 are coupled to medium voltage substation bus 552 through a conduit 609. Rotary tap selector 602 includes a plurality of radially outer notches 610 and a first notch selector arm 612 configured to couple with radially outer notches 610. Radially outer notches 610 are configured with odd numerals 1 through 15 corresponding to a plurality of odd numbered OLTC transformer taps 1 through 15 that are coupled to portions of primary windings 554 in incremental portions of windings 554. Rotary tap selector 602 also includes a plurality of radially inner notches 614 and a second notch selector arm 616 configured to couple with radially inner notches 614. Radially inner notches 614 are configured with even numerals 2 through 16 corresponding to a plurality of even numbered OLTC transformer taps 2 through 16 that are coupled to portions of primary windings 554 in incremental portions of windings 554. Odd numbered OLTC transformer taps 1 through 15 and even numbered OLTC transformer taps 2 through 16 define plurality of OLTC transformer taps 618.

Selection of taps 1 through 16 of plurality of OLTC transformer taps 618 regulates an inductive coupling between primary windings 554 and secondary windings 556 by selecting a tap 1 through 16 that provides a predetermined ratio of the number of primary windings 554 to the number of secondary windings 556. Such windings' ratio facilitates a predetermined primary-to-secondary voltage ratio. In the example shown in FIG. 6, the turns ratio increases with increasing the tap number from 1 through 16. The relationship of the number of turns and the voltages is shown as:

$$V_{IN}/V_{OUT}=T_1/T_2, \quad \text{Equation (1)}$$

where $V_{IN}$ represents the inlet voltage, i.e., high voltage on primary windings 554, $V_{OUT}$ represents the outlet voltage, i.e., low voltage on secondary windings 556, $T_1$ represents the number of winding turns associated with primary windings 554, and $T_2$ represents the number of winding turns associated with secondary windings 556.

Tap changer 600 also includes a motor 620 coupled to a tap selection arm 622 that is configured to selectively move each of first notch selector arm 612 and second notch selector arm 616 to a predetermined odd notch 610 and even notch 614, respectively. Tap changer 600 further includes at least one switch 624, e.g., without limitation, a diverter switch, that operate in conjunction with motor 620 to select which of the 16 taps is in service. Tap changer 600 also includes additional equipment, e.g., and without limitation, transition/limiting resistors. Computing device 105 is coupled to motor 620 and switches 624 to operate tap changer 600 as described further below.

In operation, one of 1 through 16 of plurality of OLTC transformer taps 618 is selected to provide a first predetermined ratio of primary windings 554 to secondary windings 556. First notch selector arm 612 is positioned to one of radially outer notches 610 oddly numbered 1 through 15 and second notch selector arm 616 is positioned to one of radially inner notches 614 evenly numbered 2 through 16. However, switches 624 select only one of first notch selector arm 612 and second notch selector arm 616 at any one time. Therefore, commands from computing device 105 selectively reposition one of first notch selector arm 612 and second notch selector arm 616 through operation of motor 620 and tap selection arm 622, i.e., the arm 612 or 616 that is not currently associated with the in-service tap. Only numerically adjacent taps can be selected for the next move, e.g., first notch selector arm 612 can shift from notch 1 to notch 3, but not from notch 1 to notch 5 or from notch 1 to notch 15. Once the desired tap notch is selected, computing device 105 operates switches 624 to select the previously unselected notch selector arm 612 or 616 in the new tap position and then de-select the previously selected arm 612 and 616 in a make-before-break manner, thereby establishing a second predetermined ratio of primary windings 554 to secondary windings 556.

FIG. 7 is a graphical representation of an exemplary control scheme 700 for tap changer 600 (shown in FIG. 6). Control scheme 700 includes a y-axis 702 that represents a voltage set-point ($V_{set}$) for a voltage measured proximate transformer 550 (shown in FIGS. 5 and 6) through PTs 551 or 553 (both shown in FIG. 5) for computing device 105 (shown in FIG. 2) and transformer 550 to control to. Alternatively, voltages measured proximate feeder end 534 (shown in FIG. 5) through PT 532 (shown in FIG. 5) may be used. Control scheme 700 also includes an x-axis 704 that represents electric power transmitted through transformer 550. Y-axis 702 is labeled using the "per-unit" system, i.e., the intersection of y-axis 702 with x-axis 704 is equivalent to the nominal rated voltage of distribution system 500 (shown in FIG. 5) and is provided a unit value of 1.0 per-unit (pu).

The uppermost voltage set-points are usually determined by the electric utility that operates transformer 550 and distribution system 500. These uppermost voltage set-points are typically based on regulations and established standards. For instance, assume the allowed voltage range at a customer's service point is +/−10% of nominal voltage, i.e. 0.90 pu to 1.10 pu. Also, e.g., assume that the voltage drop in the low voltage grid, i.e., from the substation to the customer's point of interconnection is 5%, and another 0.5% voltage drop is assumed in the house connection line. Then a worst case scenario is assumed for positive power flow, i.e., a positive power flow is measured over the OLTC transformer, but there is one feeder with a large DG unit feeding in power, i.e., a line with a large DG unit at the end of the feeder and a very large load right at the beginning of the feeder. In this case, a voltage rise of 5.5% in the opposite direction of the power flow measured at the OLTC transformer might result. Therefore, even if positive power flow is measured over the OLTC transformer, the voltage set-point may not exceed 1.045 pu in order to leave this safety margin of 5.5% voltage rise in the opposite power flow direction and thus still ensure the voltage is below the maximum allowed voltage of 1.1 pu. Therefore, in the exemplary embodiment, the uppermost voltage set-point is 1.045 pu, i.e., 104.5% of the nominal rated voltage.

The lowermost voltage set-points are usually determined by the electric utility in a manner similar to that used for the uppermost voltage limits described above. The allowed voltage range at a customer's service point is +/−10% of nominal voltage, i.e. 0.90 pu to 1.10 pu. Also, e.g., assume that the voltage drop in the low voltage grid, i.e., from the substation to the customer's point of interconnection is 5%, and another 0.5% voltage drop is assumed in the house connection line. Then a worst case scenario is assumed for reverse power flow, i.e., a reverse power flow is measured over the OLTC transformer, but there is one feeder with a large load drawing a large amount of electric power, i.e., a line with a large DG unit at the beginning of the feeder and a very large load at the end of the feeder. In this case, a voltage rise of 5.5% in the opposite direction of the power flow measured at the OLTC transformer might result. Therefore, even if reverse power flow is measured over the OLTC transformer, the voltage set-point may not exceed 0.955 pu in order to leave this safety margin of 5.5% voltage rise in the opposite power flow direction and thus still ensure the voltage is below the minimum allowed voltage of 0.90 pu. Therefore, in the exemplary embodiment, the lowermost set-point is 0.955 pu, i.e., 95.5% of the nominal rated voltage.

The methods for deriving the uppermost and lowermost voltage set-points and values for such set-points are for example only. Alternatively, any values for the uppermost and lowermost voltage set-points that enable operation of transformer 550 and tap changer 600 (shown in FIG. 6) as described herein are used.

The uppermost forward, or positive power flow parameters associated with x-axis 704 are determined by factors that include, without limitation, the number of consumers connected to feeder line segments 526 and their estimated electric power consumption as a function of time. A determination is made as to the highest expected customer power load ($LD_{max}$). Similarly, the uppermost reverse power flow determination ($PV_{max}$) is made using factors that include, without limitation, known values for installed DG coupled to feeder line segments 526.

The limits along y-axis 702 for transformer substation voltage and x-axis 704 for forward and reverse power flows define two points, i.e., first point 706 and second point 708. Computing device 105 (shown in FIG. 2) generates a first OLTC transformer power flow dependent set-point characteristic 710 such that first OLTC transformer power flow dependent voltage set-point characteristic 710 is configured to extend substantially linearly between first point 706 and second point 708. Therefore, as power flow varies between $PV_{max}$ and $LD_{max}$ the voltage set-point varies substantially linearly and tap changer 600 is operated by computing device 105 to select the appropriate tap 1 through 16 of plurality of taps 618 that coincide with the associated voltage set-point. The coordinates of first point 706 and second point 708 are loaded into memory device 110 as predetermined voltage parameters for transformer 550.

Control scheme 700 is an adaptive power flow dependent variable voltage set-point scheme. Therefore, in the event of a tap change in the exemplary embodiment, computing device 105 generates a second OLTC transformer power flow dependent voltage set-point characteristic 712. Second characteristic 712 includes a substantially constant voltage, or hysteresis portion 714 for a predetermined range of electric power flow through transformer 550, i.e., for a predetermined range parallel to x-axis 704, such predetermined range at least partially based on a predetermined deviation of power flow through the OLTC transformer from the actual value of power flow at the instant of the tap change. As used herein, the term "hysteresis" refers to the tendency of second characteristic 712, and subsequent characteristics, to depend not only on current voltage and power flow conditions, but to depend on previous characteristics. Thus, hysteresis refers to the tendency to create substantially flat portions that significantly slow down the change in voltage set-point as a function of power flow through transformer 550. Therefore, computing device 105 generates second characteristic 712 to intersect with first characteristic 710 at a midpoint 716 such that first characteristic 710 bisects hysteresis portion 714 into two equal hysteresis sections 718 defined by endpoints 720 and 722 with midpoint 716. Hysteresis sections 718 have a length L/2 that is proportional to a predetermined hysteresis factor. In the exemplary embodiment, the predetermined hysteresis factor is within a range between approximately 0% and approximately 25% of the power flow defined by either $PV_{max}$ and $LD_{max}$. Alternatively, any values of hysteresis factor that enable operation of electric power distribution system 500 as described herein are used, including, without limitation, within a range between approximately 5% and approximately 25%.

Second characteristic 712 also includes a first portion 724 parallel to first characteristic 710 and extending from first endpoint 720 of hysteresis portion 714 to a $PV_{max}$ point 726 defined by $PV_{max}$. Second characteristic 712 also includes a second portion 728 parallel to first characteristic 710 and extending from second endpoint 722 of hysteresis portion 714 to a $LD_{max}$ point 730 defined by $LD_{max}$. Therefore, first parallel portion 724 and second parallel portion 728 are offset by hysteresis portion 714. Alternatively, hysteresis portion 714 may extend in only one direction from first characteristic 710 for a predetermined offset distance.

In the exemplary embodiment, hysteresis portion 714 facilitates reducing a potential for further tap changes after the first tap change by allowing small changes in power flow at a substantially constant voltage set-point up to a pair of limits defined by endpoints 720 and 722. However, if the change in power flow extends beyond, e.g., endpoint 720, the voltage set-point is regulated according to first parallel portion 724 and if the power flow change is large enough, a second tap change is executed and a third OLTC transformer power flow dependent voltage set-point characteristic 732 is generated. Third characteristic 732 includes a hysteresis portion 734 similar to hysteresis portion 714, including having length L, with the exception that hysteresis portion 734 is bisected by first parallel portion 724 of second characteristic 712. Also, third characteristic 732 includes a first parallel portion 736 offset distance L from first characteristic 710 and a second parallel portion 738 that is substantially coincident with first characteristic 710.

As shown above, the feature associated with a subsequent characteristic bisecting an immediately preceding characteristic facilitates maintaining at least a portion of the plurality of preceding characteristics generated during typical changes in power flow through transformer 550. For those circumstances where a fourth tap change will be in response to decreasing reverse power flow and an increased voltage set-point, such fourth characteristic (not shown) will be substantially similar to second characteristic 712.

In general, since newly generated characteristics will have a substantially horizontal portion, such as hysteresis portions 714 and 734, they will not resemble first characteristic 710 with its lack of inflection. Alternatively, in some embodiments, computing device 105 is configured to generate at least some subsequent characteristics that are substantially similar to first characteristic 710. Also, in some embodiments, computing device 105 is configured to generate characteristics having parameters that include generating subsequent characteristics only within predetermined proximity ranges to first characteristic 710. Further, in some embodiments, computing device 105 is configured to generate characteristics that shift the characteristics in only one direction.

Figure 8:
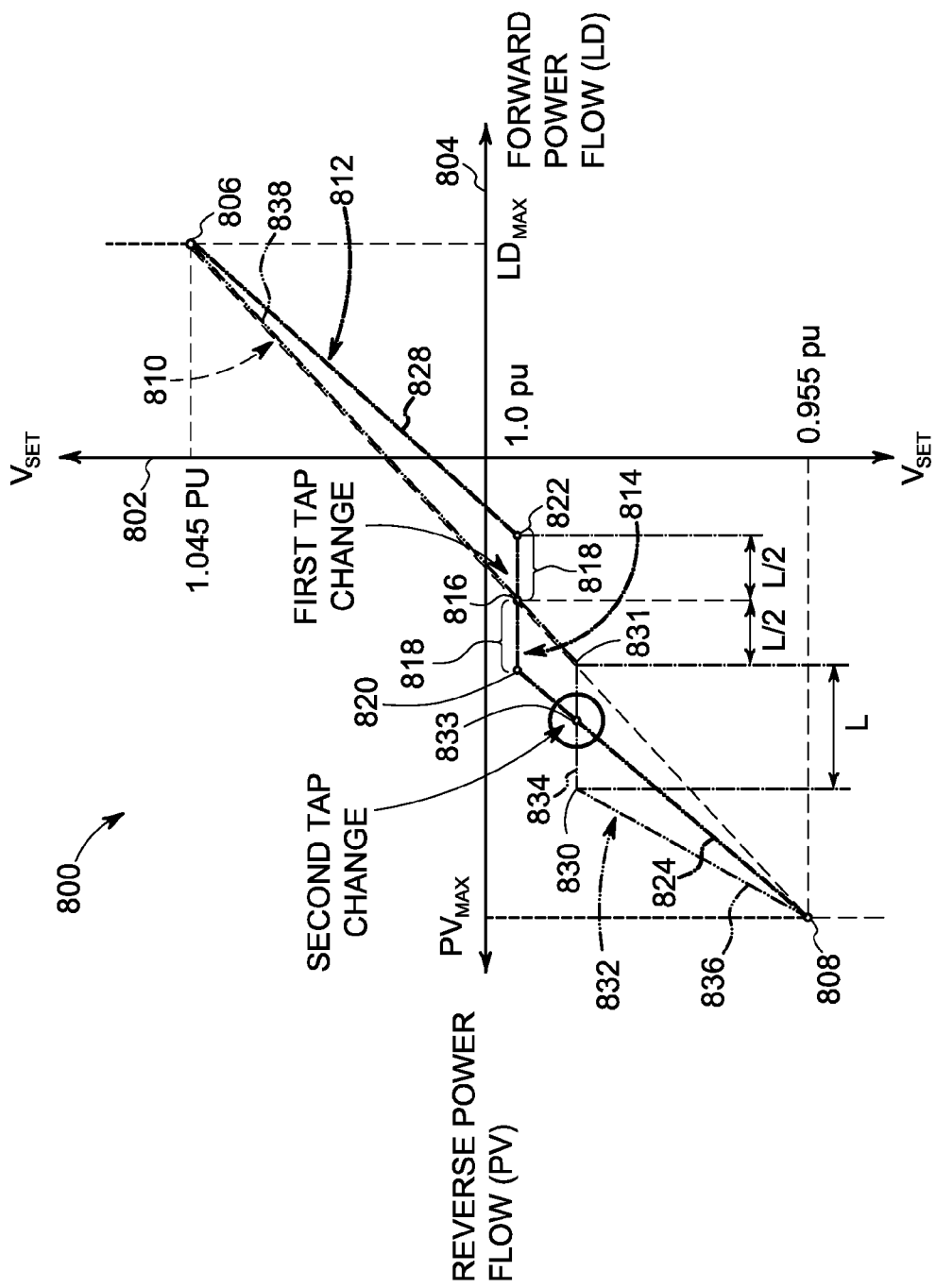
FIG. 8 is a graphical representation of an alternative control scheme for the tap changer device shown in FIG. 6.

FIG. 8 is a graphical representation of an alternative control scheme 800 for tap changer 600 (shown in FIG. 6). Control scheme 800 includes a y-axis 802 that represents a voltage set-point ($V_{set}$) for a voltage measured proximate transformer 550 (shown in FIGS. 4 and 5) through PTs 551 or 553 (both shown in FIG. 4) for computing device 105 (shown in FIG. 2) and transformer 550 to control to. Alternatively, voltages measured proximate feeder end 534 (shown in FIG. 4) through PT 532 (shown in FIG. 4) may be used. Control scheme 800 also includes an x-axis 804 that represents electric power transmitted through transformer 550. Y-axis 802 is labeled using the "per-unit" system, i.e., the intersection of y-axis 802 with x-axis 804 is equivalent to the nominal rated voltage of distribution system 500 (shown in FIG. 4) and is provided a unit value of 1.0 per-unit (pu).

The uppermost voltage set-points and the lowermost voltage set-points are determined as described above.

The uppermost forward, or positive power flow parameters associated with x-axis 804 are determined by factors that include, without limitation, the number of consumers connected to feeder line segments 526 and their estimated electric power consumption as a function of time. As such, a determination is made as to the highest expected customer power load ($LD_{max}$). Similarly, the uppermost reverse power flow determination ($PV_{max}$) is made using factors that include, without limitation, known values for installed DG coupled to feeder line segments 526 associated with transformer 550.

The limits along y-axis 802 for transformer substation voltage and x-axis 804 for forward and reverse power flows define two points, i.e., first point 806 and second point 808. Computing device 105 generates a first OLTC transformer power flow dependent voltage set-point characteristic 810 such that first OLTC transformer power flow dependent voltage set-point characteristic 810 is configured to extend substantially linearly between first point 806 and second point 808. Therefore, as power flow varies between $PV_{max}$ and $LD_{max}$ the voltage set-point varies substantially linearly and tap changer 600 is operated by computing device 105 to select the appropriate tap 1 through 16 of plurality of taps 618 that coincide with the associated voltage set-point. The coordinates of first point 806 and second point 808 are loaded into memory device 110 as predetermined parameters for transformer 550.

Control scheme 800 is an adaptive power flow dependent variable voltage set-point scheme. In the event of a tap change in the exemplary embodiment, computing device 105 generates a second OLTC transformer power flow dependent voltage set-point characteristic 812. Second characteristic 812 includes a substantially constant voltage, or hysteresis portion 814 for a predetermined range of electric power flow through transformer 550, i.e., for a predetermined range parallel to x-axis 804, such predetermined range at least partially based on a predetermined deviation of power flow through the OLTC transformer from the actual value of power flow at the instant of the tap change. Therefore, computing device 105 generates second characteristic 812 to intersect with first characteristic 810 at a midpoint 816 such that first characteristic 810 bisects hysteresis portion 814 into two equal hysteresis sections 818 defined by endpoints 820 and 822 with midpoint 816. Hysteresis sections 818 have a length L/2 that is proportional to a predetermined hysteresis factor. In the exemplary embodiment, the predetermined hysteresis factor is within a range between approximately 5% and approximately 25% of the power flow defined by either $PV_{max}$ and $LD_{max}$. Alternatively, any values of hysteresis factor that enable operation of computing device 105 and electric power distribution system 500 as described herein are used.

Second characteristic 812 also includes a first portion 824 oblique to first characteristic 810 and extending from first endpoint 820 of hysteresis portion 814 to second point 808. Second characteristic 812 also includes a second portion 828 oblique to first characteristic 810 and extending from second endpoint 822 of hysteresis portion 814 to first point 806. Therefore, first oblique portion 824 and second oblique portion 828 are offset by hysteresis portion 814. Alternatively, hysteresis portion 814 may extend in only one direction from first characteristic 810 for a predetermined offset distance.

In the exemplary embodiment, hysteresis portion 814 facilitates reducing a potential for further tap changes after the first tap change by allowing small changes in power flow at a substantially constant voltage set-point up to a pair of limits defined by endpoints 820 and 822. However, if the change in power flow extends beyond, e.g., endpoint 820, the voltage set-point is regulated according to first oblique portion 824 and if the power flow change is large enough, a second tap change is executed and a third OLTC transformer power flow dependent voltage set-point characteristic 832 is generated. Third characteristic 832 includes a hysteresis portion 834 similar to hysteresis portion 814, including having length L, with the exception that hysteresis portion 834 is bisected by first oblique portion 824 of second characteristic 812 at a midpoint 833. Hysteresis portion 834 is defined by endpoints 830 and 831. Also, third characteristic 832 includes a first oblique portion 836 extending from first endpoint 830 of hysteresis portion 834 to point 808. Further, third characteristic 832 includes a second oblique portion 838 that extends from second endpoint 831 of hysteresis portion 834 to point 806. Therefore, first oblique portion 836 and second oblique portion 838 are offset by hysteresis portion 834.

Maintaining such proximity to at least a portion of the plurality of preceding characteristics facilitates operation of transformer 550 through a substantial portion of the ranges associated with the voltage set-point limits and power flow limits that define points 806 and 808. For those circumstances where a fourth tap change will be in response to decreasing reverse power flow and an increased voltage set-point, such fourth characteristic (not shown) will be substantially similar to second characteristic 812.

In general, since newly generated characteristics will have a substantially horizontal portion, such as hysteresis portions 814 and 834, they will not resemble first characteristic 810 with its lack of inflection. Alternatively, in some embodiments, computer device 105 is configured to generate at least some subsequent characteristics that are substantially similar to first characteristic 810. Also, in some embodiments, computer device 105 is configured to generate characteristics having parameters that include generating subsequent characteristics only within predetermined proximity ranges to first characteristic 810. Further, in some embodiments, computer device 105 is configured to generate characteristics that shift the characteristics in only one direction.

Figure 9:
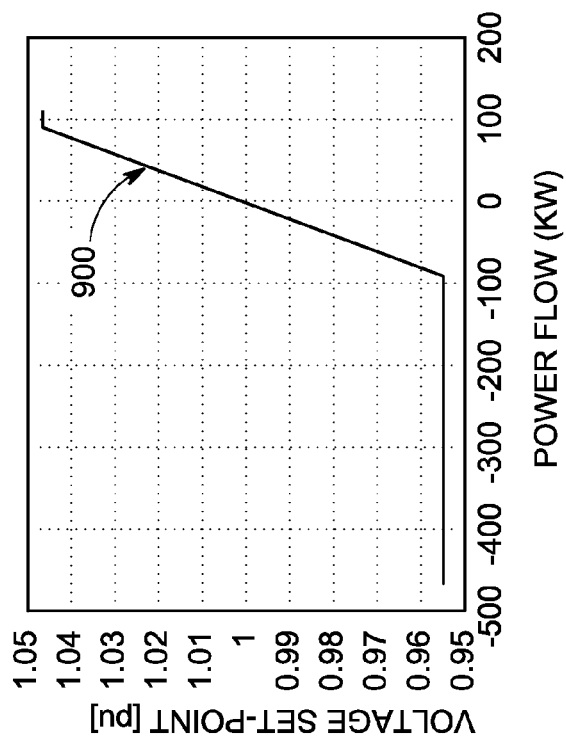
FIG. 9 is a graphical representation of a static control scheme of the tap changer device shown in FIG. 6 prior to implementation of the control schemes shown in FIGS. 7 and 8.

FIG. 9 is a graphical representation of a static control scheme 900 of tap changer 600 (shown in FIG. 6) prior to implementation of control schemes 700 and 800 (shown in FIGS. 7 and 8, respectively). Control scheme 900 is shown as a voltage set-point in units of pu as a function of power flow in kW.

Figure 10:
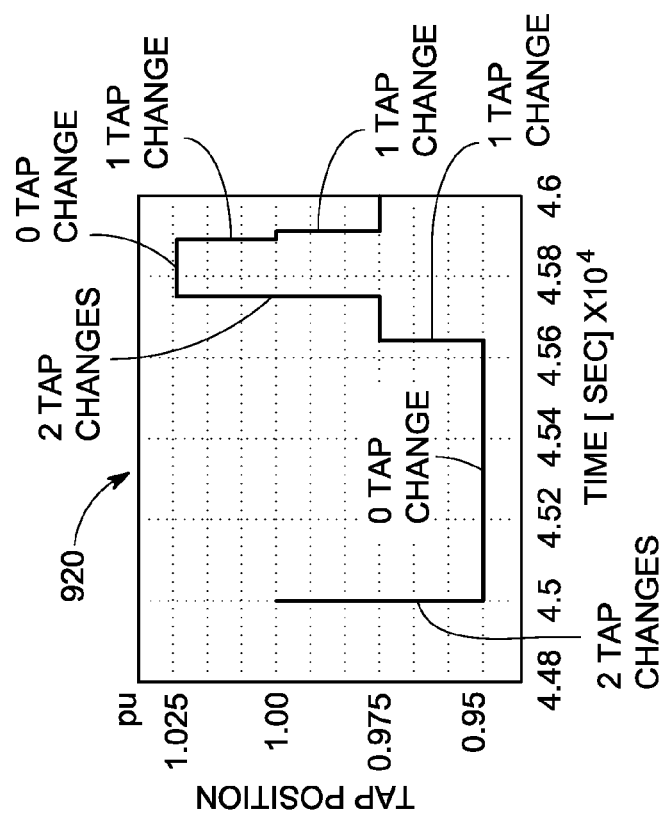
FIG. 10 is a graphical representation of tap positions of the tap changer device shown in FIG. 6 during use of the control scheme shown in FIG. 9.
Figure 11:
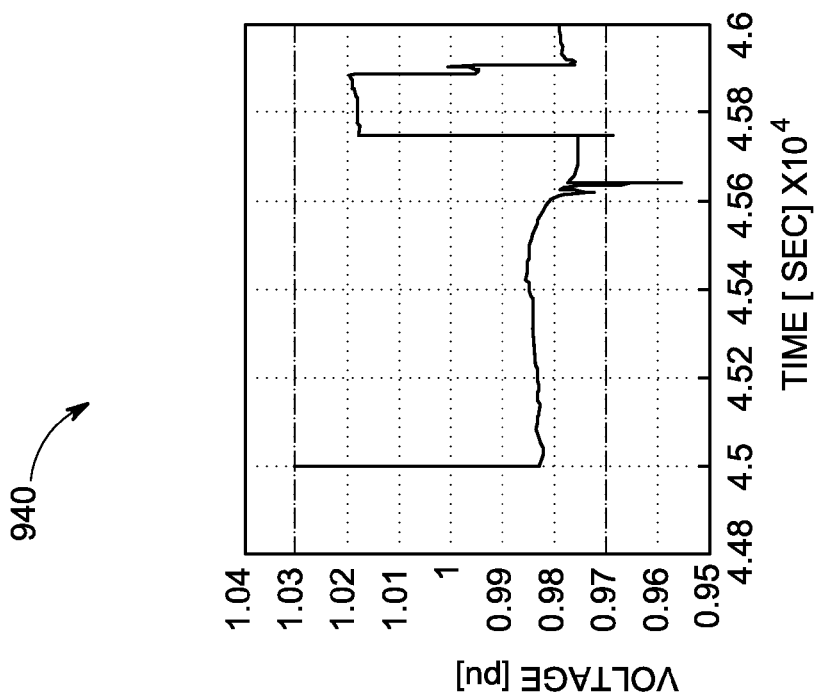
FIG. 11 is a graphical representation of voltage changes at a feeder end of the electric power distribution system shown in FIG. 5 due to the tap changer device shown in FIG. 6 during use of the control scheme shown in FIG. 9.

FIG. 10 is a graphical representation of tap positions 920 of tap changer 600 (shown in FIG. 6) during use of control scheme 900 (shown in FIG. 9). Each tap change is equivalent to approximately 0.025 pu. FIG. 11 is a graphical representation of voltage changes 940 at an end of a feeder line segment 534 (shown in FIG. 5) of electric power distribution system 500 (shown in FIG. 5) due to operation of tap changer 600 (shown in FIG. 6) during use of control scheme 900 (shown in FIG. 9). At approximately $4.5*10^4$ seconds, tap changer 600 shifts the selected tap downward twice. A resultant voltage drop from approximately 1.00 pu to approximately 0.98 pu is induced, where the voltage remains relatively constant until a voltage drop due to additional loads on feeder line segment 526 is induced at approximately $4.565*10^4$ seconds. Tap changer 600 shifts upward one tap and voltage is restored to approximately 0.975 pu. Two additional successive upward tap changes at approximately $4.575*10^4$ seconds increase the voltage to approximately 1.018 pu. One downward tap change at approximately $4.585*10^4$ seconds and another downward tap change at approximately $4.59*10^4$ seconds provides for voltage decreases to approximately 1 pu and 0.979 pu, respectively.

Figure 12:
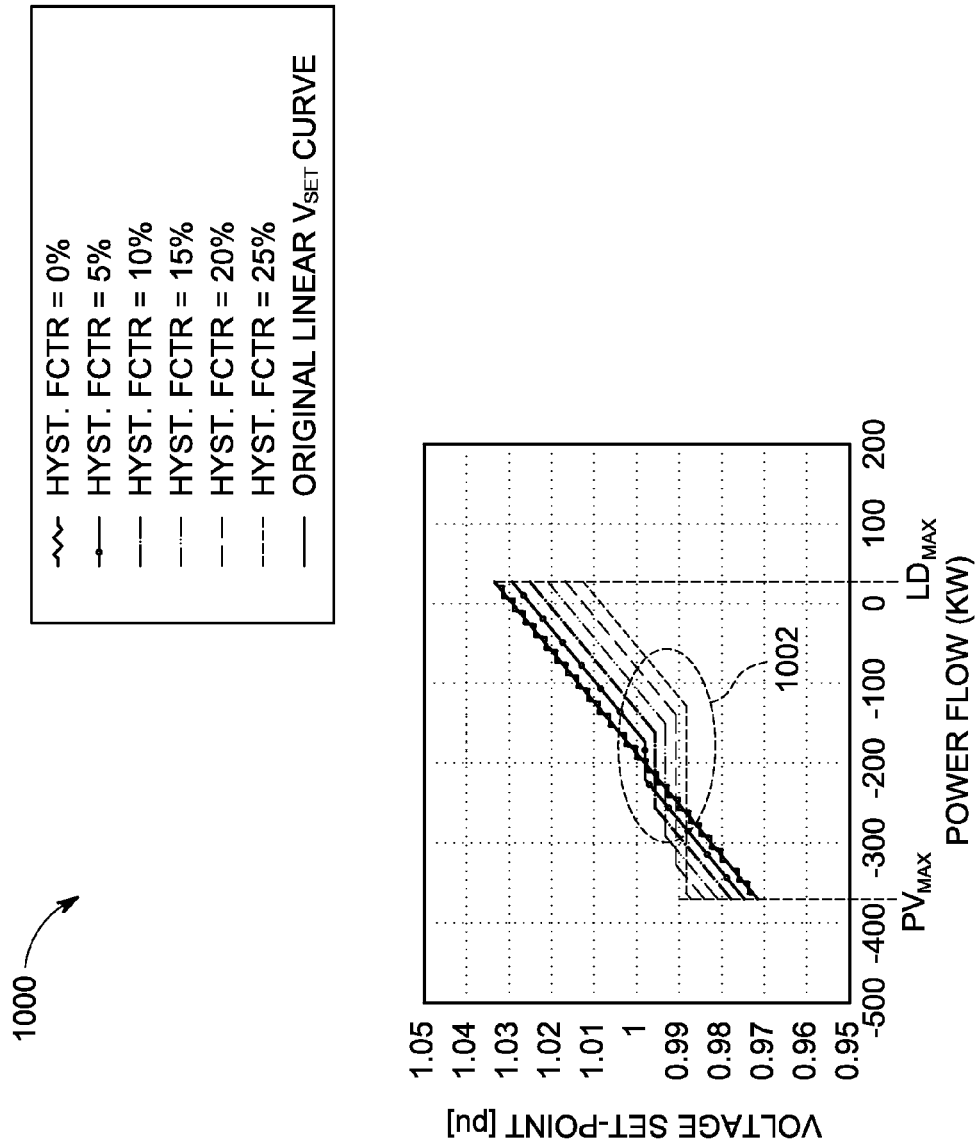
FIG. 12 is a graphical representation of the control scheme shown in FIG. 7 for the tap changer device shown in FIG. 6 for a plurality of hysteresis factors.

FIG. 12 is a graphical representation 1000 of control scheme 700 (shown in FIG. 7) for tap changer 600 (shown in FIG. 5) comparing a plurality of hysteresis factors. The hysteresis factor is increased from 0% to 25% in 5% increments for illustration of the effect of the magnitude of the hysteresis factor. As shown in area 1002, the hysteresis, i.e., constant voltage portions increase in length as the hysteresis factor increases. Therefore, as the hysteresis factor increases, the offsets from older characteristics increases.

Figures 13, 14:
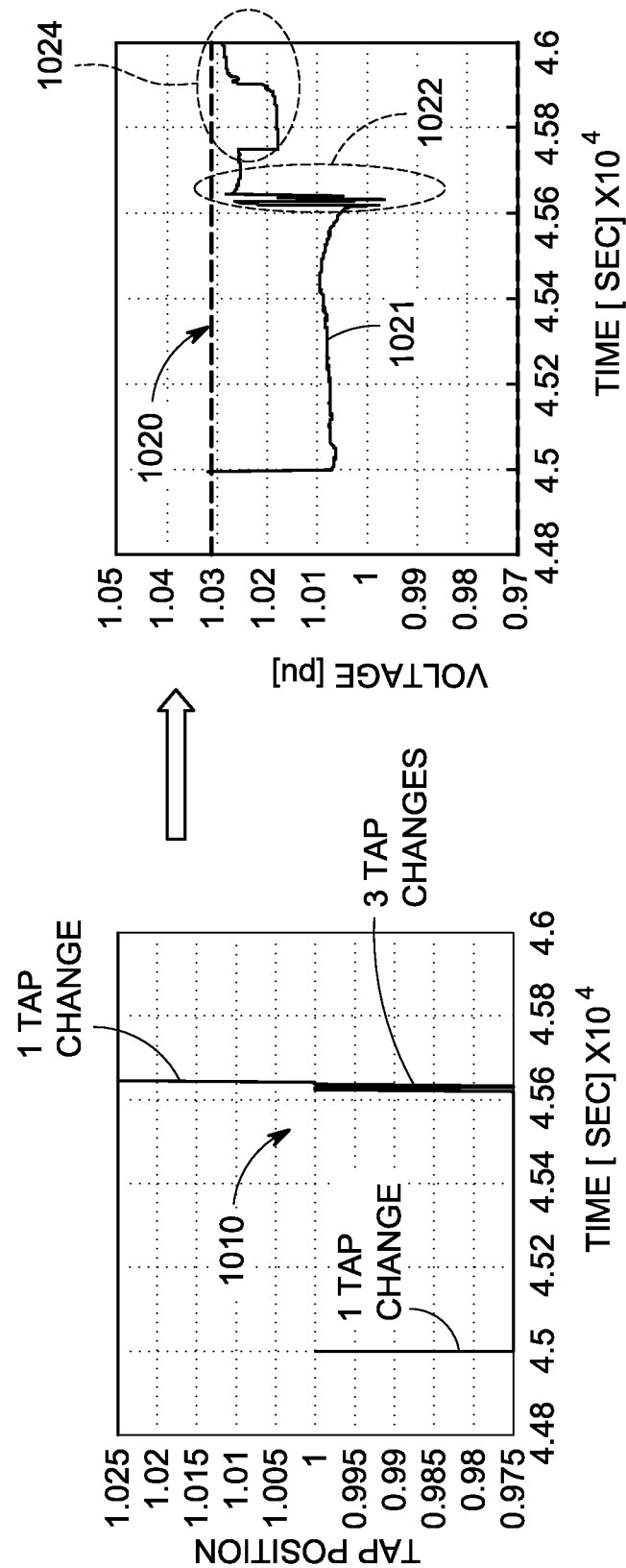
FIG. 13 is a graphical representation of tap positions of the tap changer device shown in FIG. 6 during use of the control scheme shown in FIG. 7 with a hysteresis factor of 0%.
FIG. 14 is a graphical representation of voltage changes at a feeder end of the electric power distribution system shown in FIG. 5 due to the tap changer device shown in FIG. 6 during use of the control scheme shown in FIG. 7 with a hysteresis factor of 0%.

FIG. 13 is a graphical representation of tap positions 1010 of tap changer 600 (shown in FIG. 6) during use of control scheme 700 (shown in FIGS. 7 and 12) with a hysteresis factor of 0%. FIG. 14 is a graphical representation of voltage changes 1020 at feeder end 534 of electric power distribution system 500 (both shown in FIG. 5) due to tap changer 600 (shown in FIG. 6) during use of control scheme 700 (shown in FIGS. 7 and 12) with a hysteresis factor of 0%. FIG. 15 is a graphical representation of tap changes 1030 of tap changer 600 (shown in FIG. 6) during use of control scheme 700 (shown in FIGS. 7 and 12) with a hysteresis factor of 15%. FIG. 15 is a graphical representation of voltage changes 1040 at feeder end 534 of electric power distribution system 500 (both shown in FIG. 5) due to tap changer 600 (shown in FIG. 6) during use of control scheme 700 (shown in FIGS. 7 and 12) with a hysteresis factor of 15%. Assume the same power loads and DG for both cases.

In the exemplary embodiment, comparing FIGS. 13 and 15, i.e., comparing a 0% hysteresis factor with a 15% hysteresis factor, tap changes 1010 include a total of five tap changes with three in quick succession. Tap changes 1030 include a first tap change and a second tap change. The increased hysteresis factor increases the horizontal portion, i.e., the portion with constant voltage set-point, of the voltage set-point characteristics, thereby decreasing the number of tap changes by increasing the power flow change tolerated with an existing tap setting. Comparing FIGS. 14 and 16, i.e., comparing a 0% hysteresis factor with a 15% hysteresis factor, voltage changes 1020 and 1040 include a similar voltage change 1021 and 1041, respectively, to approximately 1.008 pu for a single tap change. However, comparing voltage changes 1022 and 1042, the changes in 1042 are less frequent and have a lower amplitude. The voltage characteristic 1024 ranges between approximately 1.018 and 1.028 pu. In contrast, the voltage characteristic 1044 ranges between approximately 0.992 pu and 1.003 pu. Therefore, with a lower number of tap changes, a smoother voltage with smaller voltage differentials is obtained. Also, unnecessary tap changes due to fast variations of load or DG power are avoided by introducing the hysteresis factor.

The above-described control schemes for the tap changers embedded within the on-load tap changing (OLTC) transformers typically used by the electric power distribution systems described herein provide a cost-effective method for regulating voltage on such distribution systems. Specifically, the embodiments described herein replace known static power flow-dependent voltage set-point characteristics with adaptive characteristics that are determined through the number of previous tap changes in the tap changer. More specifically, the embodiments described herein include a hysteresis factor that facilitates generating a substantially horizontal, i.e., a substantially constant voltage versus power flow characteristic in a variable voltage set-point characteristic that allows limited changes in power flows after a tap change without incurring additional short-term tap changes. Therefore, the embodiments described herein dynamically and adaptively regulate voltage while decreasing tap changes, thereby facilitating smooth and stable voltage control on the feeders downstream of the transformer regardless of variable electrical conditions due to fast variations in loads and distributed generation (DG). The decreased number of tap changes facilitates extending the service life of the tap changers and improves the regulation of voltage on electric distribution networks.

In addition, as compared to control schemes such as those shown in FIG. 1, resource expenditure in defining complex parameters required for conformance with utility requirements is significantly reduced. For example, in the embodiments described herein, constant voltage set-points of the control scheme for the higher ends of reverse and forward power flows, i.e., segments 42 and 50 do not need to be defined. Also, power flow values for the associated breakpoints 46 and 54. i.e., power flow values 48 and 56, respectively, are not required. In contrast with such known control schemes, the embodiments described herein only require two set values by the utility, which is typically easily achieved. Therefore, embodiments described herein may be implemented within most electric distribution grids without complex adaptation and parameter definition.

An exemplary technical effect of the methods, systems, and apparatus described herein includes at least one of: (a) providing an adaptive and variable OLTC transformer power flow dependent voltage set-point control scheme; (b) substantially decreasing the number of tap changes used to regulate voltage on feeders downstream of distribution substation transformers; (c) ensuring correct voltage regulation during periods of reverse power flow due to distributed generation, thereby facilitating smoother voltages; and (d) decreasing complex adaptations and parameter definitions associated with utility requirements.

Exemplary embodiments of electric power distribution systems for transmitting electric power to customer loads downstream of a distribution substation transformer, and methods of operating such systems and devices are not limited to the specific embodiments described herein, but rather, components of systems and/or steps of the methods may be utilized independently and separately from other components and/or steps described herein. For example, the methods may also be used in combination with other systems requiring electric power transmission and the associated methods, and are not limited to practice with only the transmission and distribution systems and methods as described herein. Rather, the exemplary embodiment can be implemented and utilized in connection with many other transmission applications that are currently configured to transmit and receive electric power, e.g., and without limitation, distribution systems in remote areas and industrial facilities.

Although specific features of various embodiments of the invention may be shown in some drawings and not in others, this is for convenience only. In accordance with the principles of the invention, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric power system comprising:
    an on-load tap changing (OLTC) transformer comprising a plurality of primary windings and a plurality of secondary windings, at least a portion of one of said primary windings and said secondary windings inductively coupled to each other;
    at least one on-load tap changer coupled to at least one of said plurality of primary windings and said plurality of secondary windings, said at least one on-load tap changer selectively configurable to regulate the portion of at least one of said primary windings and said secondary windings inductively coupled to each other;
    at least one processor coupled to said at least one on-load tap changer, said at least one processor configured to adaptively regulate a voltage set-point of said on-load tap changer as a function of an adaptive OLTC transformer power flow dependent voltage set-point characteristic;
    wherein said processor is further configured to:
        generate a first OLTC transformer power flow dependent voltage set-point characteristic, wherein at least a portion of the first OLTC transformer power flow dependent set-point characteristic is configured to extend substantially linearly between at least one of a predetermined reverse electric power flow value and a predetermined forward electric power flow value; and
        generate a second OLTC transformer power flow dependent voltage set-point characteristic including a substantially constant voltage set-point portion for a predetermined range of transformer electric power flow.

2. The electric power system in accordance with claim 1, wherein said processor is further configured to generate the second OLTC transformer power flow dependent set-point characteristic such that the substantially constant voltage set-point portion intersects with the first OLTC transformer power flow dependent set-point characteristic.

3. The electric power system in accordance with claim 1, wherein the predetermined range of transformer electric power flow defines a hysteresis portion extending between approximately 0% and 25% of the at least one of the predetermined reverse electric power flow value and the predetermined forward electric power flow value.

4. The electric power system in accordance with claim 1, wherein said processor is further configured to generate at least one of:
    the second OLTC transformer power flow dependent set-point characteristic including at least one portion substantially parallel to the at least a portion of the first OLTC transformer power flow dependent set-point characteristic extending substantially linearly between at least one of the predetermined reverse electric power flow value and the predetermined forward electric power flow value; and
    the second OLTC transformer power flow dependent set-point characteristic including at least one portion intersecting with the first OLTC transformer power flow dependent set-point characteristic through at least one of the predetermined reverse electric power flow value and the predetermined forward electric power flow value.

5. The electric power system in accordance with claim 1 further comprising at least one memory device coupled to said at least one processor, said at least one memory device configured to store the predetermined reverse electric power flow value and the predetermined forward electric power flow value as predetermined parameters for said OLTC transformer.

6. The electric power system in accordance with claim 1, wherein the second OLTC transformer power flow dependent set-point characteristic is generated as a result of a tap change.

7. A tap changer for an on-load tap changing (OLTC) transformer, the OLTC transformer including a plurality of primary windings and a plurality of secondary windings, the OLTC transformer further including a plurality of taps, each tap of the plurality of taps coupled to a different portion of at least one of the plurality of primary windings and the plurality of secondary windings, said tap changer comprising:
    a tap selection device configured to selectively engage a portion of said plurality of taps;
    a drive device coupled to said tap selection device;
    at least one processor coupled to said drive device, said at least one processor configured to adaptively regulate a voltage set-point of said tap changer as a function of an adaptive OLTC transformer power flow dependent voltage set-point characteristic;

wherein said processor is further configured to:
generate a first OLTC transformer power flow dependent set-point characteristic, wherein at least a portion of the first OLTC transformer power flow dependent set-point characteristic is configured to extend substantially linearly between at least one of a predetermined reverse electric power flow value and a predetermined forward electric power flow value; and
generate a second OLTC transformer power flow dependent set-point characteristic including a substantially constant voltage set-point portion for a predetermined range of transformer electric power flow.

8. The tap changer in accordance with claim 7, wherein said processor is further configured to generate the second OLTC transformer power flow dependent set-point characteristic such that the substantially constant voltage set-point portion intersects with the first OLTC transformer power flow dependent set-point characteristic.

9. The tap changer in accordance with claim 7, wherein the predetermined range of transformer electric power flow defines a hysteresis portion extending between approximately 0% and 25% of the at least one of the predetermined reverse electric power flow value and the predetermined forward electric power flow value.

10. The tap changer in accordance with claim 7, wherein said processor is further configured to generate at least one of:
the second OLTC transformer power flow dependent set-point characteristic including at least one portion substantially parallel to the at least a portion of the first OLTC transformer power flow dependent set-point characteristic extending substantially linearly between at least one of the predetermined reverse electric power flow value and the predetermined forward electric power flow value; and
the second OLTC transformer power flow dependent set-point characteristic including at least one portion intersecting with the first OLTC transformer power flow dependent set-point characteristic through at least one of the predetermined reverse electric power flow value and the predetermined forward electric power flow value.

11. The tap changer in accordance with claim 7 further comprising at least one memory device coupled to said at least one processor, said at least one memory device configured to store the predetermined reverse electric power flow value and the predetermined forward electric power flow value as predetermined parameters for the OLTC transformer.

12. The tap changer in accordance with claim 7, wherein the second OLTC transformer power flow dependent set-point characteristic is generated as a result of a tap change.

13. A method of regulating a voltage on at least a portion of an electric distribution system, the electric distribution system including at least one on-load tap changing (OLTC) transformer that includes a plurality of primary windings and a plurality of secondary windings and a tap changer configured to regulate an inductive coupling between the plurality of primary windings and the plurality of secondary windings, the tap changer including at least one processor, said method comprising:
measuring electric power flow transmitted through the OLTC transformer;
measuring a voltage of the at least a portion of the electric power system;
adaptively regulating a voltage set-point of the tap changer as a function of an adaptive OLTC transformer power flow dependent voltage set-point characteristic;
wherein regulating a voltage set-point comprises:
generating a first OLTC transformer power flow dependent set-point characteristic, wherein at least a portion of the first OLTC transformer power flow dependent set-point characteristic is configured to extend substantially linearly between at least one of a predetermined reverse electric power flow value and a predetermined forward electric power flow value; and
generating a second OLTC transformer power flow dependent set-point characteristic including a substantially constant voltage set-point portion for a predetermined range of transformer electric power flow.

14. The method in accordance with claim 13, wherein generating the second OLTC transformer power flow dependent set-point characteristic comprises generating the second OLTC transformer power flow dependent set-point characteristic such that the substantially constant voltage set-point portion intersects with the first OLTC transformer power flow dependent set-point characteristic.

15. The method in accordance with claim 13, wherein generating the second OLTC transformer power flow dependent set-point characteristic comprises at least one of:
generating the second OLTC transformer power flow dependent set-point characteristic including at least one portion substantially parallel to the at least a portion of the first OLTC transformer power flow dependent set-point characteristic extending substantially linearly between at least one of the predetermined reverse electric power flow value and the predetermined forward electric power flow value; and
generating the second OLTC transformer power flow dependent set-point characteristic including at least one portion intersecting with the first OLTC transformer power flow dependent set-point characteristic through at least one of the predetermined reverse electric power flow value and the predetermined forward electric power flow value.

16. The method in accordance with claim 13, wherein generating the second OLTC transformer power flow dependent set-point characteristic comprises defining a hysteresis portion extending between approximately 0% and 25% of the at least one of the predetermined reverse electric power flow value and the predetermined forward electric power flow value.

17. The method in accordance with claim 13 further comprising generating the second OLTC transformer power flow dependent set-point characteristic as a result of a tap change.

* * * * *